US006941521B2

(12) United States Patent
Lin et al.

(10) Patent No.: US 6,941,521 B2
(45) Date of Patent: Sep. 6, 2005

(54) METHOD FOR DYNAMICALLY GENERATING A USER INTERFACE FROM XML-BASED DOCUMENTS

(75) Inventors: George Lin, Bellevue, WA (US); Xiaodong Xu, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 10/109,818

(22) Filed: Mar. 29, 2002

(65) Prior Publication Data

US 2003/0184585 A1 Oct. 2, 2003

(51) Int. Cl.[7] .................................. G06F 3/00
(52) U.S. Cl. .................. 715/762; 715/764; 715/760; 715/513; 715/514
(58) Field of Search .................. 345/762, 764; 707/1; 715/760, 853, 762, 763, 780, 764, 513–515, 517; 717/106–108, 121, 136, 143, 144

(56) References Cited

U.S. PATENT DOCUMENTS 6,571,253 B1 * 5/2003 Thompson et al. ......... 345/762

2002/0089542 A1 * 7/2002 Imamura ................. 345/764
2002/0196281 A1 * 12/2002 Audleman et al. ......... 345/762

OTHER PUBLICATIONS http://www.w3.org/tr/wd–dom/introduction.html; Jonathan Robie, Texcel Rearch; What is the Document Object Model?; Mar. 4, 2000; 4 pages.*

* cited by examiner

Primary Examiner—Raymond J. Bayerl
(74) Attorney, Agent, or Firm—Blakely, Sokoloff, Taylor and Zafman (57) ABSTRACT

A method for dynamically generating a graphical user interface (GUI) from XML-based documents. In accordance with the method, visual components or display objects for building a GUI are defined, as well as a layout hierarchy describing layout relationships between the display objects, specifying how related display objects are to be laid out relative to each other on a layout window in the GUI. XML elements in an XML document pertaining to respective display objects are identified. A GUI is generated by rendering the identified display objects on the layout window, wherein the size and the position of each display object is based on layout rules defined by the layout hierarchy and a hierarchical position of the XML element pertaining to the display object within a hierarchy of XML elements of the XML document. The appearance of display objects in the GUI may also be altered through the use layout descriptors.

28 Claims, 9 Drawing Sheets

*FIG. 1*

```xml
- <Pip3A4PurchaseOrderRequest>
  - <PurchaseOrder>
    - <PhysicalAddress>
      - <cityName><FreeFormText>ASHBURN</FreeFormText> </cityName>
      - <addressLine1> <FreeFormText>TELOS CORP</FreeFormText></addressLine1>
      - <addressLine2><FreeFormText>1988 MAIN ROAD</FreeFormText></addressLine2>
      - <addressLine3><FreeFormText /> </addressLine3>
      - <NationalPostalCode>20147</NationalPostalCode>
      - <regionName><FreeFormText>VA</FreeFormText> </regionName>
      - <GlobalCountryCode>US</GlobalCountryCode>
    - </PhysicalAddress>
    - <comment><FreeFormText>SEE RTG GUIDE-SURF</FreeFormText> </comment>
    - <ProductLineItem>
      - <shipFrom><GlobalLocationIdentifier>0478978550000</GlobalLocationIdentifier> </shipFrom>
      - <ProductQuantity>13</ProductQuantity>
      - <LineNumber>002</LineNumber>
      - <productUnit>
        - <ProductPackageDescription>
          - <ProductDescription>
            - <GlobalProductIdentifier>00675900174023</GlobalProductIdentifier>
          - </ProductDescription>
        - </ProductPackageDescription>
      - </productUnit>
      - <requestedShipDate><DateStamp>20001021Z</DateStamp> </requestedShipDate>
      - <GlobalProductUnitOfMeasureCode>Each</GlobalProductUnitOfMeasureCode>
      - <SpecialHandlingInstruction><specialHandlingText>None</specialHandlingText></SpecialHandlingInstruction>
      - <requestedPrice>
        - <FinancialAmount>
          - <GlobalCurrencyCode>USD</GlobalCurrencyCode>
          - <MonetaryAmount>1099.99</MonetaryAmount>
        - </FinancialAmount>
      - </requestedPrice>
    - </ProductLineItem>
    + </ProductLineItem> ~132
    + </ProductLineItem> ~133
  - </PurchaseOrder>
  - <fromRole>
    - <PartnerRoleDescription>
      - <ContactInformation>
        - <EmailAddress>PM@ARROW.COM</EmailAddress>
        - <contactName><FreeFormText>PM</FreeFormText></contactName>
        - <telephoneNumber><CommunicationsNumber>5165551234</CommunicationsNumber></telephoneNumber>
      - </ContactInformation>
      - <BusinessDescription>
        - <BusinessName><FreeFormText>ARROW, INC</FreeFormText></BusinessName>
        - <GlobalBusinessIdentifier>555555555</GlobalBusinessIdentifier>
        - <BusinessTaxIdentifier>95-3619734</BusinessTaxIdentifier>
      - </BusinessDescription>
    - </PartnerRoleDescription>
  - </fromRole>
- </Pip3A4PurchaseOrderRequest>
```

*FIG. 2A*

- [<Pip3A4PurchaseOrderRequest>] ~126o
  - [<PurchaseOrder>] ~128o
    - [<PhysicalAddress>] ~130o  /-151 (TYP)
      - [<cityName>][<FreeFormText>]["ASHBURN"] ~158o
      - [<addressLine1>] [<FreeFormText>]["TELOS CORP"] ~159o
      - [<addressLine2>][<FreeFormText>]["1988 MAIN ROAD"] ~160o
      - [<addressLine3>][<FreeFormText />] ~161o
      - [<NationalPostalCode>]["20147"] ~162o
      - [<regionName>][<FreeFormText>]["VA"] ~163o
      - [<GlobalCountryCode>]["US"] ~164o
    - [<comment>][<FreeFormText>]["SEE RTG GUIDE-SURF"] ~146o
    - [<ProductLineItem>] ~131o
      - [<shipFrom>]
        - [<GlobalLocationIdentifier>]["0478978550000"] ~166o
      - [<ProductQuantity>]["13"] ~167o
      - [<LineNumber>]["002"] ~168o
      - [<productUnit>]
        - [<ProductPackageDescription>]
          - [<ProductDescription>]
            - [<GlobalProductIdentifier>]["00675900174023"] ~169o
      - [<requestedShipDate>][<DateStamp>]["20001021Z"] ~170o
      - [<GlobalProductUnitOfMeasureCode>]["Each"] ~171o
      - [<SpecialHandlingInstruction>][<specialHandlingText>]["None"] ~172o
      - [<requestedPrice>]
        - [<FinancialAmount>]
          - [<GlobalCurrencyCode>]["USD"] ~173o
          - [<MonetaryAmount>]["1099.99"] ~174o
    - [<ProductLineItem>] ~132o
    - [<ProductLineItem>] ~133o
  - [<fromRole>] ~134o
    - [<PartnerRoleDescription>] ~136o
      - [<ContactInformation>] ~138o
        - [<EmailAddress>]["PM@ARROW.COM"] ~175o
        - [<contactName>][<FreeFormText>]["PM"] ~176o
        - [<telephoneNumber>][<CommunicationsNumber>]["5165551234"] ~177o
      - [<BusinessDescription>] ~140o
        - [<BusinessName>][<FreeFormText>]["ARROW, INC"] ~178o
        - [<GlobalBusinessIdentifier>]["555555555"] ~179o
        - [<BusinessTaxIdentifier>]["95-3619734"] ~180o

PIP ENTRY WINDOW - PIP3A4 PURCHASE ORDER REQUEST

FILE  EDIT  HELP  DEBUG

Partner: BOSSNASS ▼  Message Type: Pip3A4PurchaseOrderRequest ▼  [SELECT] [IMPORT]

Date: Unassigned  Message ID: Unassigned  Status: Not Sent

Purchase Order — 128n

Physical Address — 130n / 130d

| | | |
|---|---|---|
| Address Line 1: 159n | TELOS CORP | 159d |
| Address Line 2: 160n | 1988 MAIN ROAD | 160d |
| Address Line 3: 161n | | 161d |
| City Name: 158n | ASHBURN | 158d |
| Region Name: 163n | VS | 163d |
| National Postal Code: 162n | 20147 | 162d |
| Global Country Code: 164n | US | 164d |

Comment: 146n  SEE RTG GUIDE-SURF

Partner Role Description — 136n / 136d

Contact Information — 138n / 138d

| | | |
|---|---|---|
| Email Address: | PM@ARROW.COM | 175d |
| Contact Name | PM | 176d |
| Telephone Number: | 51651234 | 177d |

Business Description — 140n / 140d

| | | |
|---|---|---|
| Business Name: | ARROW, INC | 178d |
| Global Business Identifier: | 555555555 | 179d |
| Business Tax Identifier: | 95-3619734 | 180d |

| Global Location I... 166n | Prod... 167n | Line... 168n | Global Product I... 169n | Request... 170n | Glo... 171n | Spec... 172n | Financi... 173n | Financi... 174n |
|---|---|---|---|---|---|---|---|---|
| 0478978550000 | 13 | 002 | 00675900174023 | 2000102... | Each | None | USD | 1099.99 |
| 1630624152810 | 27 | 003 | 00827900174023 | 2000102... | Each | None | USD | 345.99 |
| 8319702450600 | 9 | 001 | 00341900174023 | 2000102... | Each | None | USD | 449.99 |
| 166d | 167d | 168d | 169d | 170d | 171d | 172d | 173d | 174d |

[SEND DRAFT] [SEND MESSAGE] [CANCEL]

METHOD FOR DYNAMICALLY GENERATING A USER INTERFACE FROM XML-BASED DOCUMENTS

TECHNICAL FIELD

This disclosure relates generally to user interfaces, and, more particularly, relates to dynamic generation of graphical user interfaces based on XML documents.

BACKGROUND

XML, a subset of the Standard Generalized Markup Language (SGML), is the universal format for data on the World Wide Web. Using XML, users can create customized tags, enabling the definition, transmission, validation, and interpretation of data between applications and between individuals or groups of individuals. XML is a complementary format to HTML and is similar to the Hypertext Markup Language (HTML), as both contain markup symbols to describe the contents of a page or file. A difference, however, is that HTML is primarily used to specify how the text and graphic images of a Web page are to be displayed or interacted with. XML does not have a specific application but can be designed for a wider variety of applications.

XML is increasingly influencing real-world business-to-business transactions. RosettaNet, a large non-profit consortium of companies in electronics components, information technology, and semiconductor manufacturing, has begun to facilitate e-business processes among trading partners (e.g., manufacturers, distributors, resellers, carriers, and end-users) using XML-based documents called Partner Interface Processes (PIPs). A PIP is a computer-to-computer dialog that specifies services, transactions and other messages between trading partners. Presently, there are over 100 published PIP XML documents with the number expected to increase as more online transaction processes between trading partners are defined. Many of the PIPs created thus far may be related to purchase order processes and catalog publishing within the computing and electronics industries.

The efficiency of PIPs, however, can be limited based upon various factors. For example, a new PIP or a modification to an existing PIP requires creation of a new or modified graphical user interface (GUI). In conventional GUI generation a programmer must examine an XML document visually before he or she can design and create user interface components. These user interface components or objects are later built into binary format together with other software modules and released to the users or trading partners. If the trading partners desire to utilize new PIPs, or to modify existing PIPs, they must have the software maker or programmer design or change the GUI accordingly. Thus, the modification and/or creation of a graphical user interface (GUI) for a PIP often involves considerable time and expense.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is an exemplary XML source code listing illustrative of portions of a typical XML document that may be processed to generate a GUI in accordance with the embodiments of the invention discussed herein;

FIG. 2B is a representation of object model tree corresponding to the XML source code listing shown in FIG. 2A;

DETAILED DESCRIPTION OF THE ILLUSTRATED EMBODIMENTS

Embodiments of a method for generating a graphical user interface from an XML document are described herein. In the following description, numerous specific details are provided, such as exemplary graphical user interfaces (GUIs) and exemplary XML files to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
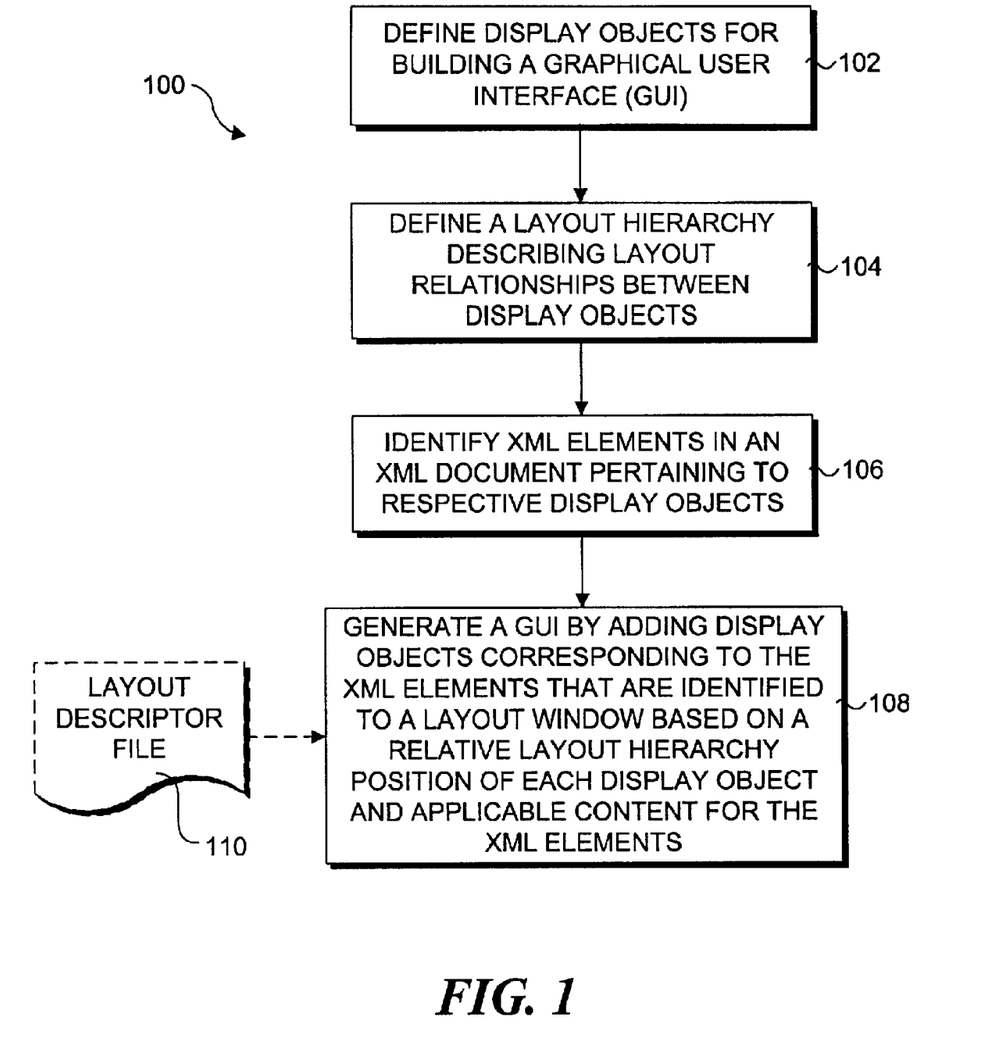
FIG. 1 is a high level flowchart illustrating the operations used to generate a graphical user interface (GUI) in accordance with one embodiment of the invention.

FIG. 1 is a high level flow chart illustrating a process for generating a graphical user interface (GUI) from an XML document in accordance with an embodiment of the invention. The process begins in a block 102, wherein display objects for building a GUI are defined. As used herein, display objects comprise the visual components (i.e., visual building blocks) that are used to form the graphical user interface. In general, the display objects may comprise objects from which common GUI's are built, such as frames, text boxes, drop-down lists, separator bars, etc. For example, in one embodiment, the display objects include group frames, panels, tables, text fields, and drop-down lists. Other types of display objects may be defined, depending on a desired display style for the layout window corresponding to the GUI.

In connection with defining the display objects, a corresponding layout hierarchy describing the layout relationships between display objects is defined in a block 104. In one embodiment, the layout hierarchy defines parent and child display objects for each display object, and how those display objects are to be positioned relative to each other in the layout window. For example, in one embodiment a parent display object may encompass a child display object, while a child display object may be contained within its parent. For instance, a group frame may encompass a plurality of text fields, or may encompass one or more sub-group frames and the display objects contained within each subgroup frame.

Once the display objects and their hierarchical relationships are defined, the automatic generation of a GUI based on the content and layout of a corresponding XML document may proceed. For example, the operations and logic illustrated by the embodiments of the invention discussed herein may be used to process PIP XML documents to automatically generate GUIs based on the content and layout of those PIP XML documents. This process begins in a block 106 in which XML elements in the XML document pertaining to respective display objects are identified. Generally, an XML element is an entity beginning with a start tag particular to a specific element type and ending with an end tag corresponding to that element type. In one embodiment, computer software is used to generate an intermediate data structure (IDS) by examining each XML element, determining if it corresponds to a display object, and if so creating a corresponding IDS object in the IDS.

The automatic GUI-generation process is completed in a block 108, wherein a GUI is generated by adding display objects corresponding to the XML elements identified in block 106 to a layout window, and determining a location of each display object based on the content of each XML element and the hierarchical layout position of its corresponding display object. As an option, customized layout information may be defined and stored in a layout descriptor file 110, which then may be used to customize the layout of the GUI, as discussed below in further detail.

Figure 2C:
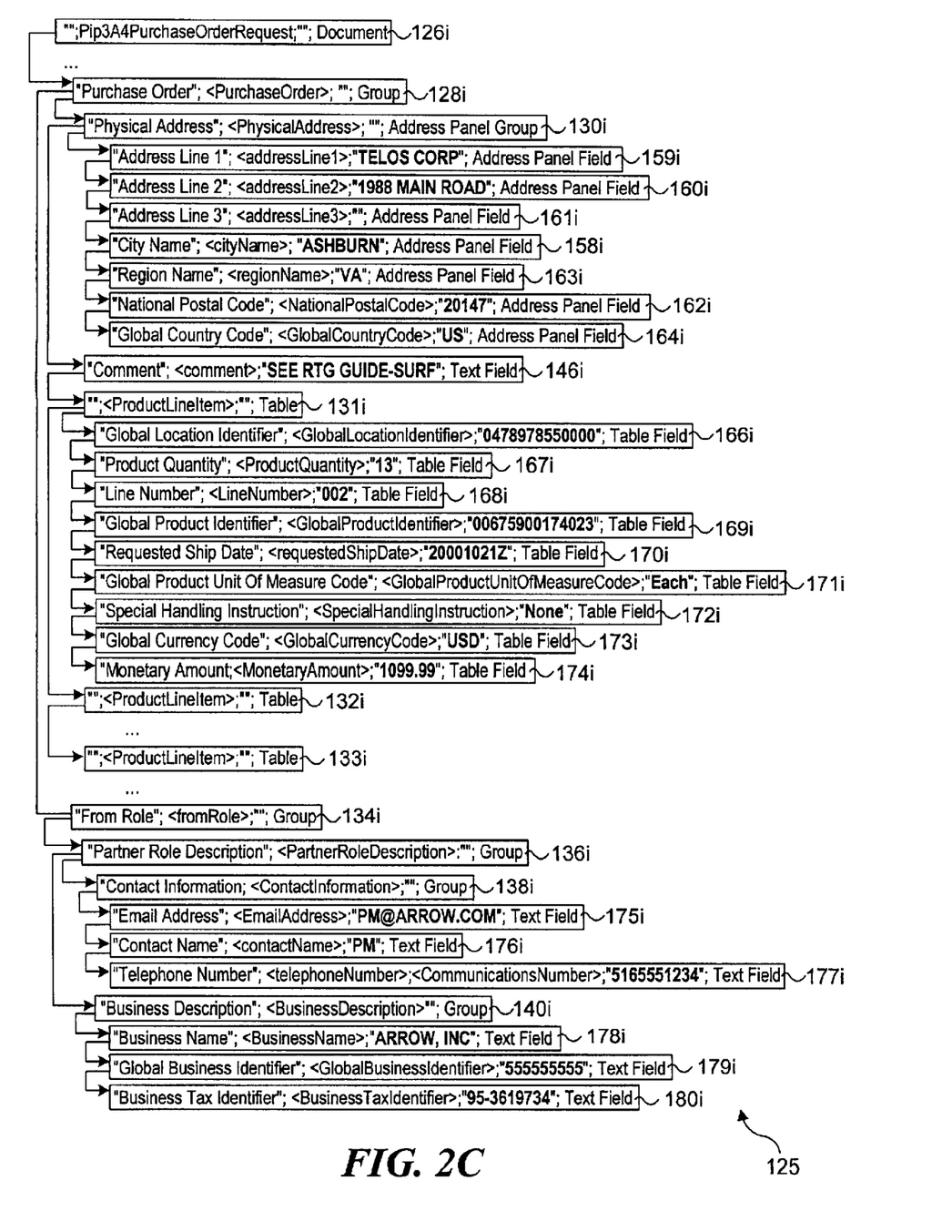
FIG. 2C is a representation of an intermediate data structure corresponding to the object model tree of FIG. 2B.
Figure 3:
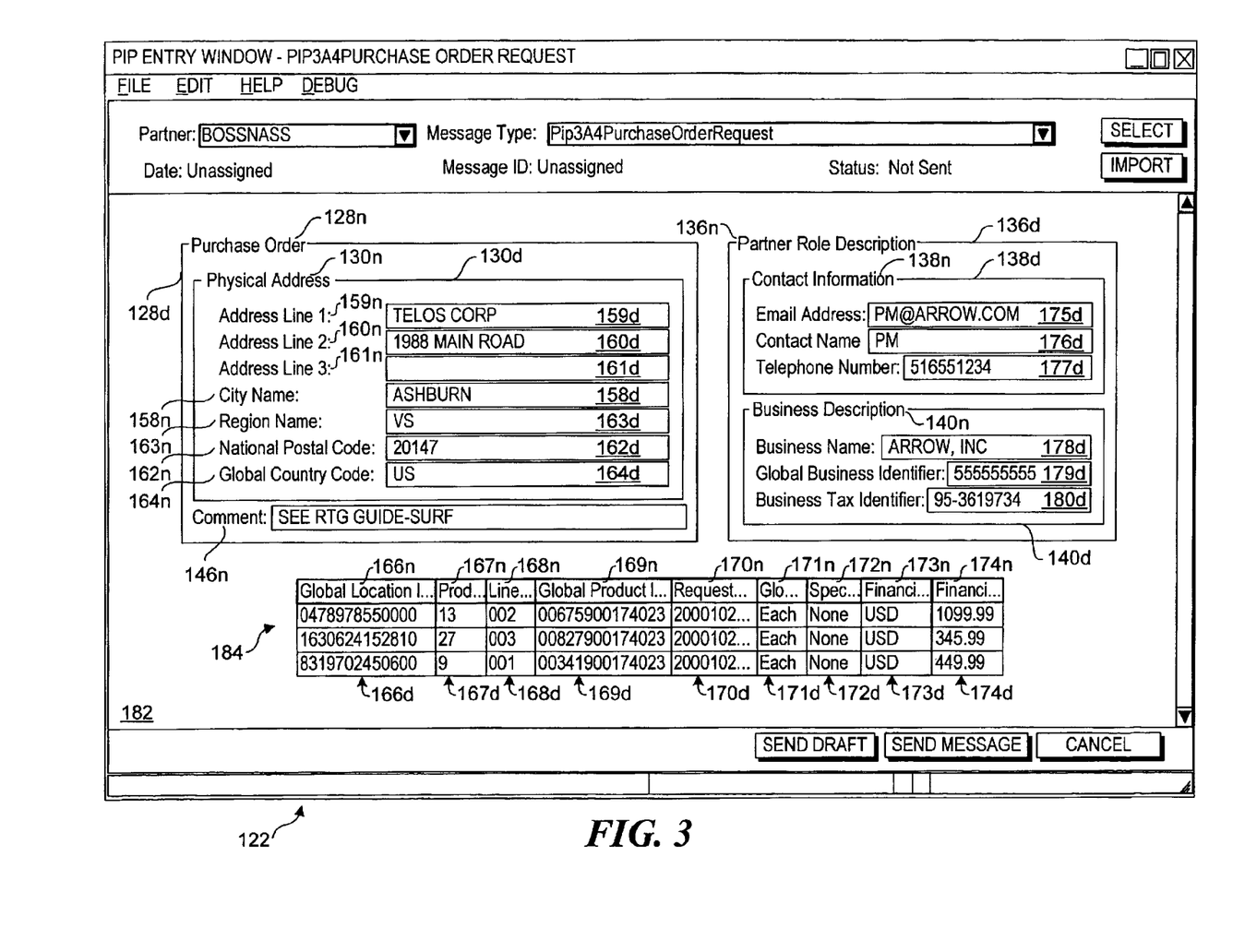
FIG. 3 is a representation of a GUI that is generated by processing the intermediate data structure of FIG. 2B.

An XML source listing 120 corresponding to an exemplary purchase order XML document and a GUI 122 that is generated in response to processing the purchase order XML document in accordance with the embodiments discussed herein are respectively shown in FIGS. 2A and 3. The source listing and GUI are illustrative of portions of a typical PIP XML document and corresponding GUI; generally, an entire PIP XML document would contain additional XML elements and the GUI would contain additional display objects corresponding to those additional XML elements. However, for purposes of clarity, these additional XML elements and display objects are not shown in FIGS. 2A and 3.

As discussed above, in one embodiment, the XML elements are processed to produce an intermediate data structure. The intermediate data structure includes a plurality of IDS objects, each of which comprise a data structure containing data pertaining to the XML element from which it is generated, such as display name, XML tag values, text or data values, etc. The IDS objects are then subsequently processed to generate a layout window corresponding to the GUI in the manner described below.

Figure 4:
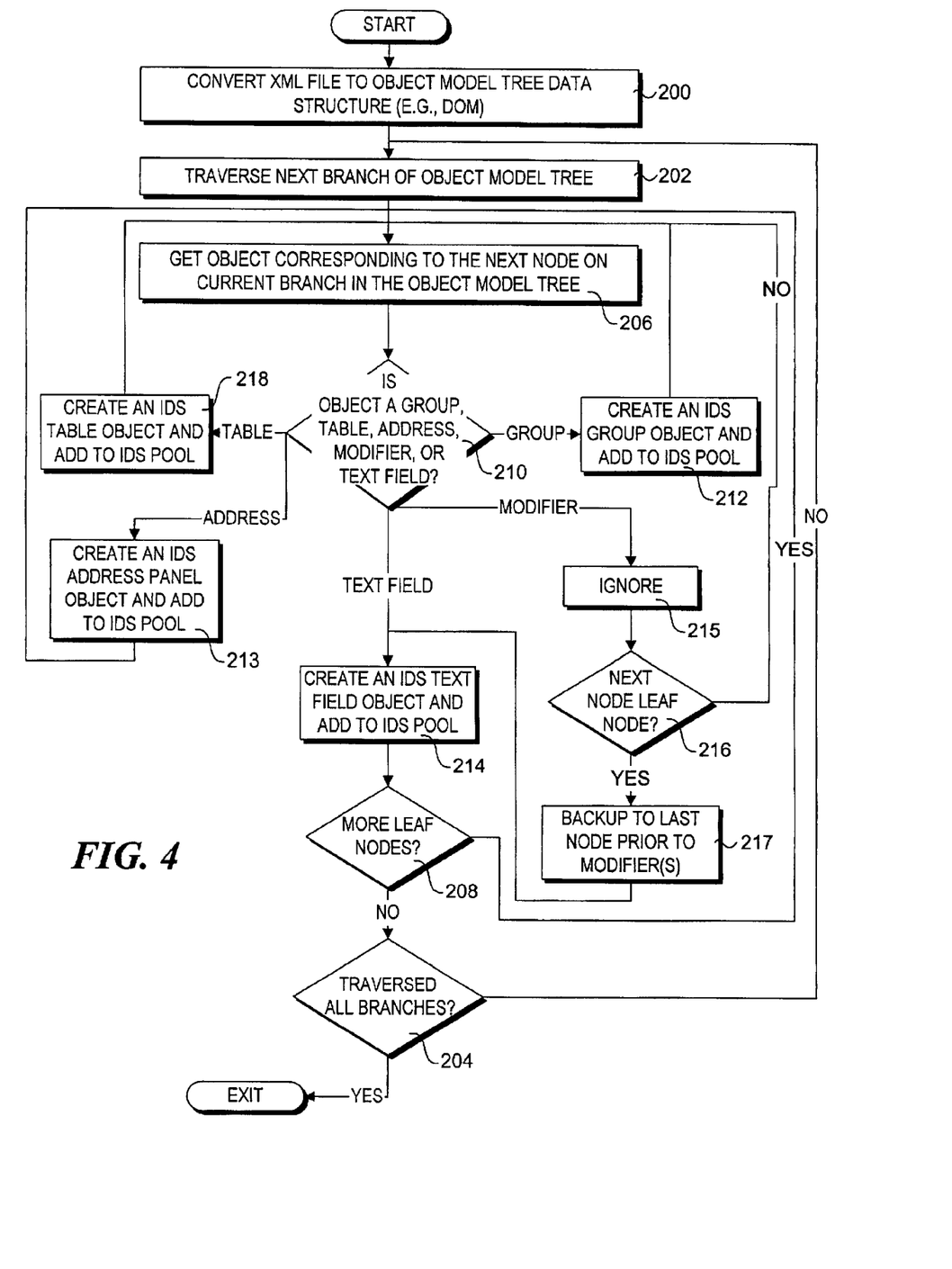
FIG. 4 is a flowchart illustrating the operations and logic implemented by one embodiment of the invention to generate an intermediate data structure (IDS)

With reference to the flowchart of FIG. 4, in one embodiment the process for generating an intermediate data structure begins in a block 200, in which an XML file is converted to an object model tree data structure such as a Document Object Model (DOM) tree. In general, this operation may be performed using one of many commercially available XML parsers. In one embodiment, the XML parser provided with Apache's Xerces XML package is used to convert the XML file into the DOM tree.

In brief, an object model contains information pertaining to objects, along with properties of those objects. Such information is typically illustrated as a tree-like data structure comprising a plurality of nodes, wherein a parent node may have one or more child nodes, and the lowest level nodes are known as leaf nodes. This parallels the natural hierarchy of well-formed XML documents. As with HTML, XML documents comprise a plurality of XML elements defined by start- and end-tag pairs, wherein each XML element contains all of the data defined between its tags. This data may typically include other XML elements, such that XML elements may be nested within other XML elements. This creates a natural tree-like hierarchy, with parent-child relationships that are similar to those used in object models.

In accordance with the foregoing similarities between XML document structures and object models, the XML parser generates a DOM tree by parsing the XML elements, extracting the inherent parent-child relationships and any corresponding data for each node. For example, XML documents typically contain a plurality of XML elements nested a various levels in the document's tree hierarchy, as defined by respective XML element start- and end-tag pairs. An object tree representation 124 corresponding to XML listing 120 is shown in FIG. 2B. Object tree representation 124 provides a logical representation of the components of a DOM tree that would result from parsing the XML of XML listing 120, and are used to create the intermediate objects. As will be recognized by those skilled in the XML arts, the actual DOM tree would provide additional information to that shown in object tree representation 124, including interfaces that enable methods to manipulate the objects to which the interfaces correspond, as well as other DOM nodes and objects. These components of the DOM tree are not used by the embodiments of the invention described herein. Accordingly, for purposes of clarity, these portions of the DOM tree have been omitted in object tree representation 124.

Each object and any associated properties in object tree representation 124 is derived from a corresponding XML element in XML listing 120, wherein the object's position in the object tree structure directly corresponds to the hierarchical position of its corresponding XML element in the XML listing. For example, a Pip3A4PurchaseOrder Request element 126 defines the top hierarchical level in XML listing 120. Accordingly, object tree representation 124 includes a Pip3A4PurchaseOrderRequest object 120o that is disposed at the top of the hierarchy, and corresponds to the "root" of the tree. This object is also known as the Document object. Similar XML elements and their corresponding objects are shown in FIGS. 2A and 2B, respectively, wherein both the XML element and object contain the same base reference number, with the object including an appended "o." Each of the XML elements labeled in FIG. 2A correspond to group elements, and include a PurchaseOrder element 128, a physical address element 130, ProductLineItem elements 131, 132, and 133, a fromRole element 134, a PartnerRoleDescription element 136, a ContactInformation element 138, and a BusinessDescription element 140. (It is noted that the XML elements contained within each of ProductLineItem elements 132, 133, are not shown for space efficiency; these XML elements would be substantially similar to those shown under ProductLineItem element 131.) The corresponding group objects in object tree representation 124 include a PurchaseOrder group object 128o, a physical address group object 130o, ProductLineItem group objects 131o, 132o, and 133o, a fromRole group object 134o, a PartnerRoleDescription group object 136o, a ContactInformation group object 138o, and a BusinessDescription group object 140o.

Returning to FIG. 4, once the XML file has been converted to the object model tree data structure, creation of intermediate data structure objects begins. This comprises starting at the root and traversing all of the branches in the object model tree, as provided by a block 202 and corresponding decision block 204, beginning with the first branch of the object model tree. In accordance with the present example, the first branch encountered corresponds to PurchaseOrder group object 128o. For each node along a currently-processed branch, the following operations disposed between a block 206 and a decision block 208 are performed in a recursive manner. For each object, a decision is made in a decision block 210 to whether that object corresponds to a group, a table, an address, a modifier, or a text field. Under DOM, group objects correspond to parent nodes having one or more child nodes, each of which are connected to the parent object's branch with a respective branch. For example, a branch 139 extending downward from a node corresponding to PurchaseOrder group object 128o is connected to branches 141, 142, 143, 144, and 145, which in turn are connected to respective nodes corresponding to PhysicalAddress group object 130o, a comment text field object 146o, and ProductLineItem group objects 131o, 132o and 133o. Branch 141 is further connected to a branch 149, which in turn is connected to a plurality of leaf nodes 150, each corresponding to a respective text field object. Text field objects, which represent the lowest level of hierarchy for a given branch, may further contain one or more modifier objects. In one embodiment, modifier objects include a FreeFormText modifier 151. In general, the modifier objects are used for data validation purposes, and are outside the scope of the invention. Modifier objects are not used for dynamic GUI generation, and are thus ignored when encountered, as discussed below.

Figure 5:
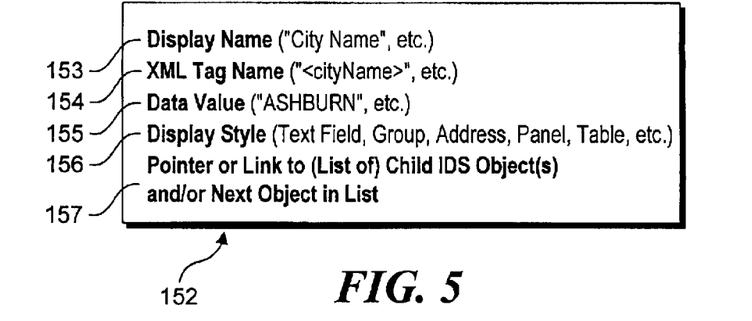
FIG. 5 is a diagram illustrating various fields contained in an IDS object.

Returning to decision block 210, if the object is a group object, a corresponding IDS group object is created in a block 212 and added to an IDS pool. The IDS pool comprises a collection of IDS objects that are logically linked using a linking mechanism somewhat akin to a linked list. An IDS object structure 152 in accordance with one embodiment of the invention is shown in FIG. 5. IDS object structure 152 includes a Display Name field 153, an XML Tag Name field 154, a Data Value field 155, a Display Style field 156, and a Pointer or Link 157 to a (list of) child IDS object(s) and/or a next IDS object in the list. Display Name 153 contains data pertaining to the label that will be displayed for the corresponding object in the layout window. XML Tag Name field 154 identifies the XML start-tag for the XML element to which the IDS object corresponds. Data Value field 155 contains the data value (e.g., text) corresponding to the object. Display Style field 156 contains information identifying which type of display object style will be used to render a display object corresponding to the IDS object in the layout window, as described below in further detail.

A representation of an exemplary intermediate data structure 125 corresponding to the present example is shown in FIG. 2C. IDS 125 contains a plurality of IDS objects, each having a structure similar to IDS object 152, wherein the pointers or links to the lists of child IDS objects and next objects in the lists are graphically depicted. In one embodiment, the IDS objects are stored in a Java data structure (i.e., as a Java object belonging to one of several hierarchical classes) that provides in implicit linking mechanism. In optional implementations, a conventional linked-list may be used. In the illustrated embodiment, each IDS object contains a link to a list of child IDS objects and/or the next object in a list or no link, as applicable. In an optional implementation, each IDS object may contain a pointer or link to its parent object.

Processing of PurchaseOrder object 128o generates a corresponding IDS group object 128i in IDS 125. The value for XML Tag Name field 154 can be directly obtained for the XML tag name of the object. In one embodiment, the value for Display Name field 148 is obtained by processing the XML Tag Name string, breaking it apart at each change in case (e.g., between the lowercase "y" and uppercase "N" in "cityName"), and converting the first character to uppercase, as necessary (e.g., the lowercase "c" to an uppercase "C." For example, in this instance <PurchaseOrder> is converted to "Purchase Order." Optionally, when the XML tags that may be contained in an XML document are known in advance, a lookup table may be used that matches XML tags to corresponding display names. Since PurchaseOrder object 128 corresponds to a group object, it does not have a corresponding entry for Data Value field 155. Its Display Style field 156 value is "Group."

Once IDS group object 128i is created, the logic loops back to block 206 to initiate the processing of the object corresponding to the next node on the branch. In this instance, the next node corresponds to Physical Address group object 130o. Normally, this group object would be processed in the manner discussed above for PurchaseOrder object 128o. However, in one embodiment, the various object types include an Address Panel object-type. In one embodiment, a lookup table is defined that contains information pertaining to how Address Panel objects are to be identified and processed. In one embodiment, data in the lookup table state that any object that includes a <PhysicalAddress> XML tag is determined to correspond to an Address Panel object.

In response to the determination in block 210 that the object is an Address Panel object, the logic flows to a block 213 in which an IDS Address Panel object is created and added to the IDS pool. This IDS Address Panel object is depicted as an IDS object 130i in IDS 125. There are two types of Address Panel objects: Address Panel Group objects and Address Panel Field objects. In this instance, IDS object 130i comprises an Address Panel Group object.

The next seven nodes that are encountered when traversing branch 149 comprise leaf nodes 150. Each of these leaf nodes is associated with a respective text field object, which include a cityName object 158o, an addressLine1 object 159o, an addressLine2 object 160o, an addressLine3 object 161o, a NationalPostalCode object 162o, a regionName object 163o, and a GlobalCountryCode object 164o. Several of objects 158o–164o further include a respective modifier object.

Normally, each of objects 158o–164o would be processed as text field objects, as described below. However, since each of these objects are child objects of Physical Address group object 130o, from which an IDS Address Panel Group object was generated above, a respective IDS Address Panel Field object is generated for each of objects 158o–164o in block 213. The values for Display Name field 153 and XML Tag name field 154 are determined in the same manner as group objects. The value for Data Value field 155 is obtained from the text string that comprises the last portion of each text field object; these values are shown in FIGS. 2B and 2C as the bolded text in quotes. Under DOM, the data values will comprise text strings. For example, the Data Value for cityName object 158o is "ASHBURN." Finally, data comprising a pointer or link to a list of child IDS objects is provided in Pointer or Link field 156. As discussed above, in the Java implementation these links are implicit.

During processing of objects 158o–161o and 163o, a FreeFormText modifier object 151 is processed. Generally, modifier objects are used for data integrity checks, and are outside the scope of the invention. Accordingly, modifier objects are ignored when encountered (e.g., a NOP is performed), as indicated by a block 215.

In the actual DOM tree, one or more modifier objects may sit between a text value and an object corresponding to the XML element containing the text value. For example, although cityName object 158o is shown adjacent to a leaf node in object tree representation 124, in the full DOM tree, each of the <cityName> and <FreeFormText> XML elements and the "ASHBURN" text value would correspond to respective nodes, with the node corresponding to the "ASHBURN" text value corresponding to a leaf node. When a IDS Text Field object is created, the object contains data corresponding to both the text value and the XML element to which the text value pertains, with the latter being used as a field label when the Text Field object is rendered. As a result, in addition to ignoring modifiers, there needs to be a means to match up XML elements pertaining to IDS Text Field objects with their corresponding text values. This is accomplished through the logic of a decision block 216 and a block 217, wherein a determination is made to whether the next node after a modifier is a leaf node (in the DOM tree), and if it is, backing up to the last node prior to the modifier (or the node prior to the first modifier, when multiple modifiers sit between an XML element and its corresponding text value). The IDS Text Field object is then created in block 214 in the manner discussed above, as if the modifier node(s) didn't exist.

Although data contained in well-formed XML documents have a defined hierarchy, the order of the data for a given hierarchical position need not be ordered. In contrast, most people are accustomed to viewing address information in a standard order, such as address, city, state, zip code, country, etc. Accordingly, processing of an Address Panel object includes defining the links between the Address Panel Field objects such that when corresponding display objects are rendered, they appear to correspond to a predetermined order. In one embodiment, this may be accomplished through use of a lookup table in which the order is defined. Thus, although cityName object 158o appears above address objects 159o–161o in object tree representation 124, the corresponding IDS objects are linked such that each of IDS objects 159i–161i (corresponding to address lines 1–3) are displayed above IDS object 158i (corresponding to a City Name corresponding to the address). Similarly, the other address panel objects are ordered to match the predetermined order in the lookup table.

After the Address Panel IDS objects have been created, the next object to be processed is a leaf node corresponding to IDS object 146o. In this instance, comment object 146o comprises a text field object, and the result of decision block 210 causes the logic to proceed to a block 214 in which an IDS text field object is created. In this case, the IDS object will have a Display Name of "Comment," a Data Value of "SEE RTG GUIDE-SURF," and a Display Style of "Text Field." As before, the FreeFromText modifier is ignored.

The next node to be encountered corresponds to ProductLineItem Group object 132o. In one embodiment, rather than traversing the object model tree from top to bottom sequentially, a recursive algorithm is employed that first examines the parent-child relationship along each branch, temporarily recording corresponding information in a memory data structure. As a result, the algorithm recognizes that a plurality of ProductLineItem group objects (131o, 132o and 133o) are connected to branch 139. When multiple group objects having the same XML Tag Name are connected to the same branch, each of the group objects becomes a candidate for a table object. A table object, as the name implies, contains information corresponding to a table that will be rendered in the layout window. Each table object contains data corresponding to a respective table row, wherein the various leaf nodes contain information corresponding to the row's column data (also referred to as Table Field data). When a table object is encountered, a corresponding IDS table object is created in a block 218, and added to the IDS pool. Subsequently, Table Field objects corresponding to the leaf nodes on the branch that extends downward from the Table object's node are also generated, with links between the objects.

For example, a branch 165 extends downward for the node adjacent ProductLineItem group object 131o. Branch 165 is directly or indirectly connected to a plurality of leaf nodes, each of which is disposed adjacent a respective Text Field object, including a GlobalLocationIdentifier object 166o, a ProductQuantity object 167o, a LineNumber object 168o, a GlobalProductIdentifier object 169o, a requestedShipDate object 170o, a GlobalProductUnitOfMeasureCode object 171o, a SpecialHandlingInstruction object 172o, a GlobalCurrencyCode object 173o, and a MonetaryAmount object 174o. When each of these Text Field objects is encountered, a corresponding IDS Table Field object is created, with a link to the next object in the list. Similar processing is performed on ProductLineItem objects 132o and 133o to generate respective table rows.

Each table includes a plurality of columns, each with a respective name. The names are determined from the objects contained below the top-level table object (e.g., ProductLineItem group object 131o) in the object tree hierarchy. In one embodiment, the name for a given column is determined by concatenating the display name for each of the objects along a relative path between the top-level table object and the leaf node corresponding to the object. For example, the column name for IDS object 166o would be a concatenation of "Ship From"+"Global Location Identifier." In another embodiment, just the Display Name corresponding to the leaf nodes are used. For example, the column name for IDS object 166o would simply be "Global Location Identifier." As described below, layout descriptors may be used to alter the appearance of various types of objects, including column names.

During subsequent processing, an IDS Table object and IDS Text Field objects for each of ProductLineItem Group objects 132o and 133o are generated in a similar manner to that of ProductLineItem group object 131o.

As traversal of the object model tree continues, IDS Group objects are generated for fromRole Group object 134o, PartnerRoleDescription Group object 136o, ContactInformation Group object 138o and BusinessDescription Group object 140o. Additionally IDS Text Field objects are created for each of an Email address object 175o, a contactName object 176o, a telephoneNumber object 177o, a BusinessName object 178o, a GlobalBusinessIdentifier object 179o, and a BusinessTaxIdentifier object 180o. This completes the processing of the object model tree, and the generation of the corresponding IDS objects of the intermediate data structure.

After the intermediate data structure has been created, the next phase is the generation of the GUI from the IDS objects. The GUI includes a layout window on which a plurality of "display objects" are rendered during generation of the GUI. In one embodiment, the display objects include group boxes, text boxes, tables, labels, address panels, and drop-down lists. The position of each display object is dependent upon a position of the display object's containing object in conjunction with layout rules defined by a layout hierarchy. In one embodiment, the layout hierarchy comprises a set of rules defining positional relationship between display objects. For example, in one embodiment there exists a rule that states a group box is drawn to contain all display objects below the group box in the layout hierarchy, including group boxes corresponding to child group objects of a parent group object. In one embodiment, these rules are stored in Java layout manager objects.

In addition to determining a location of a group box based on its position within the display object hierarchy, the size of a group box may be dynamically adjusted, based on any display objects it contains. Just prior to rendering the layout window, a final size and position for each display object is determined, and appropriate commands and data are provided to cause the display objects to be rendered accordingly on a display device.

In one embodiment, one or more Panel objects are created, and various display objects are created and added to the Panel object(s). In one embodiment, the Panel objects comprises Java JPanel objects. A recent version of the Java Development Kit (JDK) (e.g., JDK 1.3) provides a JPanel object class that operates as a container to store GUI information (e.g., display objects). JPanel objects may be nested, such that a single JPanel object may contain one or more child JPanel objects. As described in more detail below, various display objects are added to one or more JPanel objects (referred to herein simply as Panel objects) during a pre-rendering process. Layout rules defined in layout manager objects are then applied to the Panel objects to determine the size and location of each Panel in the GUI and the position of each display object the Panel contains. Corresponding GUI data is then generated by a Java Runtime Environment (JRE) component and submitted to an operating system graphic subsystem to cause a GUI containing the Panels and display objects on a display device.

Figure 6:
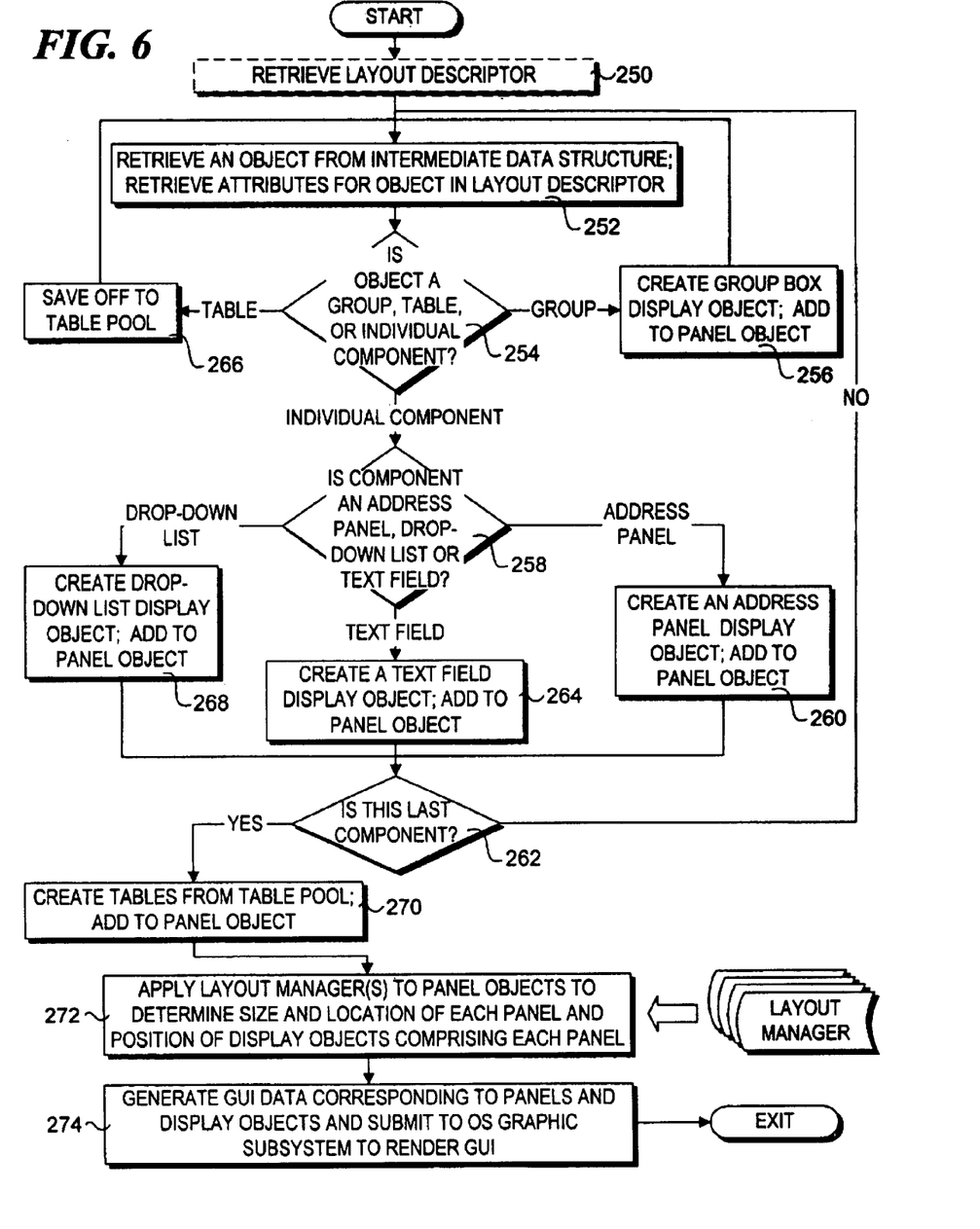
FIG. 6 is a flowchart illustrating the operations and logic implemented by one embodiment of the invention to generate a GUI based on processing an IDS corresponding to an XML document.

With reference to the flowchart of FIG. 6, in accordance with one embodiment of the invention the process for generating Panel and display objects begins in a block 250, in which a layout descriptor is retrieved. In one embodiment, the use of the layout descriptor is optional, as represented by dotted lines of box 250. In general, the layout descriptor enables a user to customize the appearance of the GUI. In one embodiment, the layout descriptor comprises a file containing layout attribute data and modifiers that specify how corresponding IDS objects are to be displayed in the layout window. Examples of a layout descriptors and their use are described below. For the purposes of the present example, it is assumed that a layout descriptor is not utilized.

Returning to the flowchart, the following operations are performed on each object in the intermediate data structure. First, in a block 252, a (next) IDS object is retrieved from the IDS. If a layout descriptor is used, corresponding layout attributes are retrieved from the layout descriptor and applied to the IDS object. Next, in a decision block 254, a determination is made to whether the IDS object is a Group object, Table object, or an individual component, such as a Text Field or Address Panel object. In the following example it is assumed that intermediate data structure 125 is processed in order from top to bottom. For example, suppose the processing of the IDS has reached IDS object 128$i$. Accordingly, in decision block 254 it would be determined that the IDS object was a Group object, and the logic would proceed to a block 256 in which a Group Box display object would be created, that includes data pertaining to the title for the group (as defined by the object's Display Name field 153 value) and a hierarchical position of the Group object in the intermediate data structure. The Group Box display object is then added to a corresponding Panel object. For example, as shown in GUI 122 of FIG. 3, when the Group Box display object is rendered, a Group Box (d)isplay object 128$d$ with a "Purchase Order" display (n)ame 128$n$ is rendered on a layout window 182.

After adding the Group Box display object to the Panel object, the process returns to block 252 to retrieve a next object from IDS 125. The next IDS object comprises IDS object 130$i$. Again, it is determined in decision block 254 that this is a Group object, and a corresponding Group Box object is added to the Panel object. During rendering, a corresponding group box 130$d$ with a "Physical Address" display name 130$n$ is displayed in layout window 182. In this instance, since IDS object 130$i$ is a child object of IDS object 128$i$, group box 130$d$ is drawn to be contained within group box 128$d$. down lists, as described below in further detail. In accordance with the present example, the next IDS object to be processed is IDS object 130$i$, which comprises an Address Panel Group object. Accordingly, in this instance the result of decision block 254 would cause the logic to flow to a decision block 258 in which a determination is made to whether the individual component comprises an address panel, drop-down list, or text field. Since the IDS object being processed is an Address Panel component, the logic proceeds to a block 260, in which an Address Panel display object is created, and added to an appropriate panel object.

After creation of the address panel display object, the logic flows to a decision block 262, wherein a check is performed to whether the component is the last component to be processed. In this case, the answer is NO, and the logic loops back to block 252 to begin processing the next IDS object.

The next seven IDS objects to be processed comprise Address Panel Field objects 158$i$–164$i$, which are child objects of Address Panel Group object 130$i$. For layout generation purposes, Address Panel Field objects are processed as if they are text field objects. Accordingly, during processing of each of IDS objects 158$i$–164$i$, the logic will proceed to a block 264 in which a Text Field display object is created, and added to the Panel object that contains the Address Panel display object. Generally, each Text Field display object will include a label having a value corresponding the IDS object's Display Name field, and a text box containing a value corresponding to the IDS object's Data Value field. Upon rendering, display objects corresponding to Text Field IDS objects 158$i$–164$i$ are displayed within group box 130$d$, and include label names 158$n$–164$n$ and text boxes 158$d$–164$d$.

After creating the Address Panel objects, the algorithm recurses back to IDS object 130$i$, where it identifies that the next object in the list corresponding to the object hierarchy layer occupied by IDS object 130$i$ is IDS object 146$i$. In response to processing IDS object 146$i$, an appropriate Text Field display object is added to the Panel object such that a label name 146*n* and a text box 146*d* are rendered on the GUI. In this instance, IDS hierarchy layer occupied by IDS object 130*i* is IDS object 146*i*. In response to processing IDS object 146*i*, an appropriate Text Field display object is added to the Panel object such that a label name 146*n* and a text box 146*d* are rendered on the GUI. In this instance, IDS object 146*i* is a child object of IDS object 128*i*, but is at the same hierarchy level as IDS object 130*i*. As a result, the label name 146*n* and text box 146*d* are positioned to be within group box 128*d*, but outside of group box 130*d*.

The processing next proceeds to IDS Table object 131*i*. In response to the operation performed in decision block 254, the logic proceeds to a block 266 in which the Table object's data is saved off to a table pool. Similarly, which each of IDS Table Field objects 166*i*–174*i* are processed, their field data is added to the table pool. Similar operations are performed for each of IDS Table objects 132*i* and 133*i* and their respective Table Field objects.

Finally, as the lower portion of IDS 125 is processed, corresponding display objects are created, positioned and added to layout window 182. Upon rendering, these display objects appear as Group boxes 136*d*, 138*d* and 140*d*, label names 136*n*, 138*n*, 140*n*, and 175–180*n*, and text boxes 175–180*d*. As discussed below, a Group box corresponding to IDS Group object 134*i* is hidden through use of a layout description.

In addition to Text Field objects and Address Panel objects, drop-down display objects may also be generated through use of a layout description, as described below. These objects are created and added to a Panel object in a block 268.

Once all of the objects have been retrieved from the IDS and processed, the answer to decision block 262 will be YES, and the logic will proceed to a block 270, wherein tables are created from the table pool. In one embodiment, a table is generated in the following manner. First the width of each column is determined. In one embodiment, this is determined based on the number of columns in the table, wherein each column has the same initial width. In another embodiment, column width determination will generally be a from the Display Name 153 values corresponding to their respective IDS objects. Lastly, the table's columns are filled with data corresponding to the Data Value 155 of the object to which they correspond. In accordance with the present example, a table 184 is added to layout window 182. Table 184 includes columns 166*d*–174*d* and column names 166*n*–174*n*. Once generated, objects corresponding to the table are added to a corresponding Panel object.

At this point, the last of the pre-rendering operations are performed. In a block 272, layout management information in appropriate layout managers are applied to respective Panel objects. This enables the size and location of each Panel (to be rendered) and the display objects comprising the Panel to be determined. Upon processing all of the Panel objects in this manner, GUI data corresponding to the Panels and display objects are generated in a block 274 by a JRE runtime component and submitted to the operating system's graphic subsystem, which in turn renders a GUI corresponding to the GUI data.

Generally, the position of the rendered panels may be controlled through a predefined set of layout rules. For example, group box 130*d* and the display objects disposed within the group box comprise a panel. Similar, group box 136*d* and the display objects disposed therein comprise another panel. In one embodiment, the layout configuration specifies the use of two columns of panels, wherein panels are stacked on top of each other within the columns, and new panels are added to the columns so that the columns appear balanced. In a similar manner, the location of tables can be specified. In one embodiment, tables are rendered below the panels. In another embodiment, if the table contains data pertaining to a parent group, the table is rendered toward the bottom of the parent group's group box.

As discussed above, customized layout information may be defined and stored in a layout descriptor, which may then be used to customize the layout and appearance of various display objects in the GUI. For example, suppose the following portion of an XML document is processed.

LISTING 1

```
<PhysicalAddress>
    <cityName>
        <FreeFormText />
    </cityName>
    <addressLine1>
        <FreeFormText />
    </addressLine1>
    <addressLine2>
        <FreeFormText />
    </addressLine2>
    <addressLine3>
        <FreeFormText />
    </addressLine3>
    <NationalPostalCode />
    <regionName>
        <FreeFormText />
    </regionName>
    <GlobalLocationIdentifier />
    <GlobalCountryCode />
</PhysicalAddress>
```

Figure 7A:
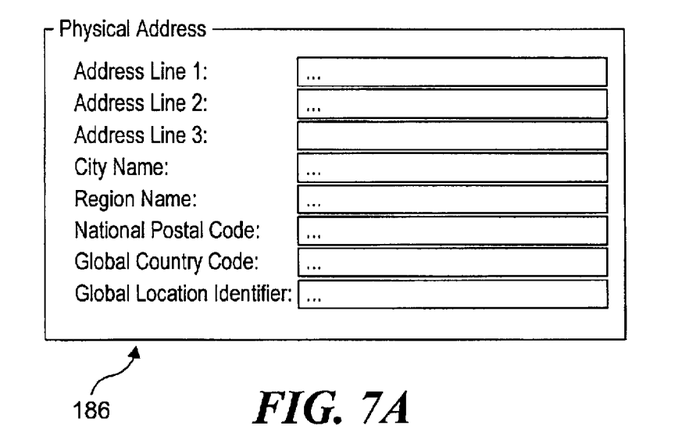
FIG. 7A is a representation of an address panel generated from a corresponding XML address element.

In accordance with the foregoing operations and logic, an Address Panel 186 will be generated in a manner similar to that shown in FIG. 7A.

Now, suppose there is a layout descriptor defined as follows:

LISTING 2

```
...PhysicalAddress/cityName.displayName=City
...PhysicalAddress/addressLine1.displayName=Address
...PhysicalAddress/addressLine2.displayName=
...PhysicalAddress/addressLine3.displayName=
...PhysicalAddress/NationalPostalCode.displayName=ZipCode
...PhysicalAddress/regionName.displayName=State
...PhysicalAddress/GlobalLocationIdentifier.displayName=GlobalCode
...PhysicalAddress/GlobalCountryCode.displayName=Country
```

Figure 7B:
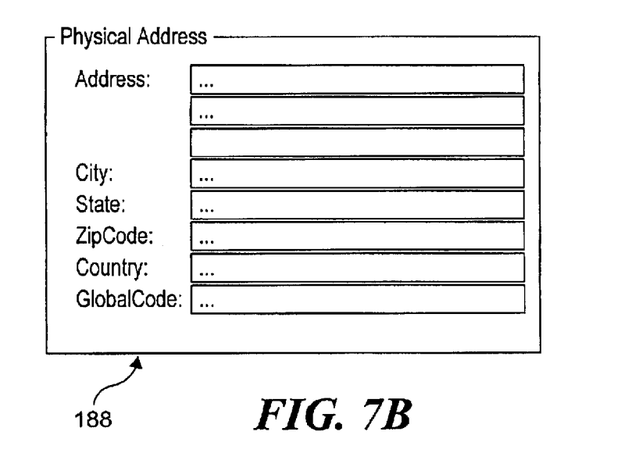
FIG. 7B is a representation of a customized address panel corresponding to the XML address element of FIG. 7A that in generated through use of a corresponding layout descriptor.

Each line in the layout descriptor defines a new label name that is to replace a default label name for a given object. For instance, the following line, . . . PhysicalAddress/cityName.displayName=City states to replace the PhysicalAddress/CityName object's display name (which by default would be "City Name") with a value of "City." In this embodiment, a "/" defines a hierarchical relationship between objects, and a ".'attribute'" defines an attribute that is to be modified. (For example, ".displayName" is a modifier that says to modify the displayName attribute in the display object. Application of the layout descriptor of Listing 2 to the XML portion of Listing 1 will produce an Address Panel 188 shown in FIG. 7B.

Other changes in the appearance of an object may also be made. For example, in one embodiment a user may hide an unwanted field and its display name by setting a "visible" attribute to false, as follows.

```
. . . PhysicalAddress/addressLine1.visible=false
```

In GUI 122, a group box corresponding to IDS Group object 134*i* is hidden through use of the ".visible" modifier.

In another embodiment, an entry field may be defined to be editable or read-only by specifying a corresponding value for a ".editable" modifier in the layout descriptor. The following layout entry makes an "Address Line1" entry field a read-only field:

```
. . . PhysicalAddress/addressLine1.editable=false
```

A layout descriptor can also be used to define the use of Combo boxes (i.e., drop-down lists). By specifying both a ".style" modifier and ".dropDownList" modifier, a user can change a entry text field to a dropdown list, either read-only or editable. The following four entries changes "Region Name" to "State", makes the "Region Name" entry field an dropdown list of four state codes (AK, AL, OR and WA), and makes the dropdown list read-only:

```
...PhysicalAddress/regionName.displayName=State
...PhysicalAddress/regionName.style=listBox
...PhysicalAddress/regionName.dropDownList=AK, AL, OR, WA
...PhysicalAddress/regionName.editable=false
```

As discussed above, if an individual component is determined to correspond to a drop-down list, the logic proceeds to a block 268, wherein a drop-down list display object is created and added to a Panel object containing the object to which the drop-down list corresponds.

Exemplary Computer System for Practicing the Invention

Figure 8:
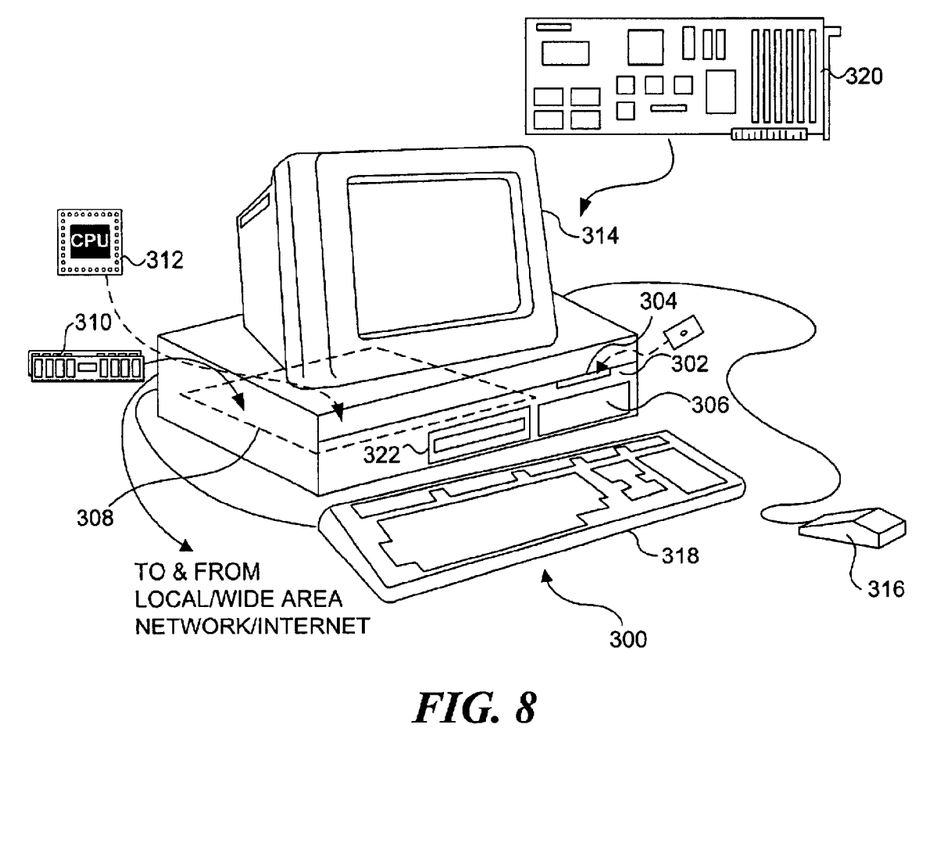
FIG. 8 is a schematic diagram of an exemplary computer system that may be used for practicing the embodiments of the invention discussed herein.

With reference to FIG. 8, a generally conventional computer 300 is illustrated, which is suitable for use as a computer system in connection with practicing the present invention, and may be used for running client and server-side software comprising one or more software modules that implement the various operations of the invention discussed above. Examples of computers that may be suitable for performing the operations of the embodiments discussed above include PC-class systems operating the Windows NT or Windows 2000 operating systems, Sun workstations operating the UNIX-based Solaris operating system, and various computer architectures that implement LINUX operating systems. Computer 300 is also intended to encompass various server architectures, as well as computers having multiple processors.

Computer 300 includes a processor chassis 302 in which are mounted a floppy disk drive 304, a hard drive 306, a motherboard 308 populated with appropriate integrated circuits including memory 310 and one or more processors (CPUs) 312, and a power supply (not shown), as are generally well known to those of ordinary skill in the art. It will be understood that hard drive 306 may comprise a single unit, or multiple hard drives, and may optionally reside outside of computer 300. A monitor 314 is included for displaying graphics and text generated by software programs and program modules that are run by the computer, including the software modules corresponding to the embodiments of the present invention discussed above. A mouse 316 (or other pointing device) may be connected to a serial port (or to a bus port or USB port) on the rear of processor chassis 302, and signals from mouse 316 are conveyed to the motherboard to control a cursor on the display and to select text, menu options, and graphic components displayed on monitor 314 by software programs and modules executing on the computer. In addition, a keyboard 318 is coupled to the motherboard for user entry of text and commands that affect the running of software programs executing on the computer. Computer 300 also includes a network interface card 320 or built-in network adapter for connecting the computer to a computer network, such as a local area network, wide area network, or the Internet.

Computer 300 may also optionally include a compact disk-read only memory (CD-ROM) drive 322 into which a CD-ROM disk may be inserted so that executable files and data on the disk can be read for transfer into the memory and/or into storage on hard drive 306 of computer 300. Other mass memory storage devices such as an optical recorded medium or DVD drive may be included. The machine instructions comprising the software that causes the CPU to implement the operations of the embodiments of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
defining display objects from which a graphical user interface (GUI) can be built;
defining a layout hierarchy comprising layout rules specifying layout relationships between the display objects;
processing an Extensible Markup Language (XML) document that includes a plurality of XML elements to identify XML elements that pertain to corresponding display objects; and
generating data by which a GUI can be rendered, said GUI comprising a plurality of display objects that are rendered on a layout window contained with the GUI, each display object containing data pertaining to an XML element to which it corresponds and being positioned on the layout window based on any relationship it may have to other display objects in accordance with the layout hierarchy.

2. The method of claim 1, wherein the GUI is dynamically generated during run-time in response to receiving an XML document.

3. The method of claim 1, wherein the XML document corresponds to a RosettaNet Partner Interface Process (PIP) XML document.

4. The method of claim 1, wherein the display objects include at least one of a group box, a text box, a label, and a table.

5. The method of claim 1, further comprising enabling an appearance of a display object to be customized through use of a layout descriptor.

6. The method of claim 1, wherein the operation of identifying XML elements that pertain to corresponding display objects comprises:

generating an object model tree comprising a plurality of objects corresponding to respective XML elements in the XML document, said object model tree further defining a hierarchical position of each object; and processing the object model tree to generate display objects based on corresponding objects in the object model tree and their respective hierarchical positions.

7. The method of claim 6, wherein the object model tree comprises a Document Object Model (DOM) tree.

8. The method of claim 7, wherein processing the object model tree to generate the display objects comprises:

processing objects in the DOM tree to generate an intermediate data structure (IDS) comprising a plurality of IDS objects and linking relationships between those IDS objects, each IDS object containing data identifying a type of display object to which it corresponds; and processing the IDS objects in the intermediate data structure to generate corresponding display objects.

9. The method of claim 8, wherein a layout position for each display object is determined based at least in part on any linking relationships between the IDS object corresponding to the display object and other IDS objects in the intermediate data structure.

10. The method of claim 1, wherein at least one of the display objects comprises a table that is generated by performing the operations of:

identifying a repeated set of XML elements in the XML document; and determining table columns and table column names based on content contained within at least one of the repeated set of XML elements; and populating the table with data contained within the repeated set of XML elements, each repeated set of XML elements defining data for a respective row in the table.

11. The method of claim 1, wherein at least one of the display objects comprises an address panel that is generated by performing the operations of:

identifying a set of related XML elements in the XML document containing address information;

extracting the address information from the set of related XML elements; and rendering an address panel on the display window containing the address information.

12. The method of claim 1, wherein generation of the GUI comprises:

generating the plurality of display objects;

adding display objects to at least one panel object;

applying a set of layout rules defined by at least one layout manager to said at least one panel object to determine a size and location of said at least one panel objects and any display objects contained therein; and generating GUI data corresponding to said at least one panel and the plurality of display objects and submitting the GUI data to an operating system graphic subsystem to render the GUI on a display device.

13. The method of claim 1, wherein tags corresponding to given XML elements are not employed for explicitly defining a type of display object to be used for displaying information corresponding to those XML elements on the GUI.

14. A method comprising:

defining display objects from which a graphical user interface (GUI) can be built;

generating an object model tree comprising a plurality of objects corresponding to respective XML elements in an XML document, said object model tree further defining a hierarchical position of each object; and processing the object model tree to generate display objects based on corresponding objects in the object model tree and a respective hierarchical position for each of the corresponding objects;

retrieving data corresponding to a layout hierarchy, said layout hierarchy defining layout rules specifying how related display objects are to be displayed relative to each other upon rendering; and dynamically generating a GUI comprising the display objects that are generated, each display object containing data pertaining to an XML element from which its corresponding object was generated from and being positioned on the GUI based on any relationship it may have to other display objects in accordance with the layout rules defined by the layout hierarchy.

15. The method of claim 14, wherein the GUI is dynamically generated by performing the operations of:

generating GUI data by which the GUI can be rendered; and passing the GUI data to a graphic subsystem of an operating system running on a computing machine to generate the GUI on a display device coupled to the computing machine.

16. The method of claim 14, wherein the object model tree comprises a Document Object Model (DOM) tree, and processing the object model tree to generate the display objects comprises:

processing objects in the DOM tree to generate an intermediate data structure (IDS) comprising a plurality of IDS objects and linking relationships between those IDS objects, each IDS object containing data identifying a type of display object to which it corresponds; and processing the IDS objects in the intermediate data structure to generate corresponding display objects.

17. The method of claim 16, wherein dynamic generation of the GUI comprises:

adding the display objects to at least one panel object;

applying a set of layout rules defined by at least one layout manager to said at least one panel object to determine a size and location of said at least one panel objects and any display objects contained therein; and generating GUI data corresponding to said at least one panel and the plurality of display objects and submitting the GUI data to an operating system graphic subsystem to render the GUI on a display device.

18. The method of claim 17, wherein the panel object comprises a Java JPanel object, and the set of rules are defined in at least Java layout manager object.

19. The method of claim 14, further comprising the operations of:

retrieving a layout descriptor defining how a display object corresponding to layout elements provided by the layout descriptor are to be rendered;

identifying display objects to which at least one layout element correspond; and applying said at least one layout element to corresponding display objects to render the display object in accordance with said at least one layout element.

20. The method of claim 14, wherein the layout descriptor provides a mechanism to covert a text field display object into a drop-down list display object.

21. A machine-readable media having instructions stored thereon that when executed by a computing machine perform the operations of:

processing an Extensible Markup Language (XML) document that includes a plurality of XML elements to identify XML elements that pertain to corresponding display objects that may be used to build a graphical user interface (GUI);

retrieving data corresponding to a layout hierarchy, said layout hierarchy defining layout rules specifying how related display objects are to be displayed relative to each other upon rendering; and generating data by which a GUI can be rendered, said GUI comprising a plurality of display objects that are rendered on a layout window contained with the GUI, each display object containing data pertaining to an XML element to which it corresponds and being positioned on the layout window based on any relationship it may have to other display objects in accordance with the layout rules defined by the layout hierarchy.

22. The computer-readable media of claim 21, wherein the GUI is dynamically generated during run-time operations in response to receiving an XML document.

23. The computer-readable media of claim 21, wherein execution of the machine instructions further performs the operations of:

retrieving a layout descriptor defining how a display object corresponding to layout elements provided by the layout descriptor are to be rendered;

identifying display objects to which at least one layout element correspond, and applying said at least one layout element to corresponding display objects to render the display object in accordance with said at least one layout element.

24. The computer-readable media of claim 21, wherein execution of the instructions identifies the XML elements that pertain to corresponding display objects by performing the operations of:

generating an object model tree comprising a plurality of objects corresponding to respective XML elements in the XML document, said object model tree further defining a hierarchical position of each object; and processing the object model tree to generate display objects based on corresponding objects in the object model tree and their respective hierarchical positions.

25. The computer-readable media of claim 24, wherein execution of the instructions processes the object model tree to generate the display objects by performing the operations of:

processing objects in the DOM tree to generate an intermediate data structure (IDS) comprising a plurality of IDS objects and linking relationships between those IDS objects, each IDS object containing data identifying a type of display object to which it corresponds;

processing the IDS objects in the intermediate data structure to generate corresponding display objects; and determining a layout position of each display object based on the linking relationships defined between the IDS objects in the intermediate data structure.

26. The computer-readable media of claim 21, wherein at least one of the display objects comprises a table that is generated through execution of the instructions by performing the operations of:

identifying a repeated set of XML elements in the XML document; and determining table columns and table column names based on content contained within at least one of the repeated set of XML elements; and populating the table with data contained within the repeated set of XML elements, each repeated set of XML elements defining data for a respective row in the table.

27. The computer-readable media of claim 21, wherein at least one of the display objects comprises an address panel that is generated through execution of the instructions by performing the operations of:

identifying a set of related XML elements in the XML document containing address information;

extracting the address information from the set of related XML elements;

retrieving data pertaining to an address panel layout specification that defines how address information is to be displayed in an address panel; and rendering an address panel on the display window containing the address information in accordance with the address panel layout specification.

28. The computer-readable media of claim 21, wherein execution of the instructions generates the GUI by performing the operations of:

generating the plurality of display objects;

adding display objects to at least one panel object;

applying a set of layout rules defined by at least one layout manager to said at least one panel object to determine a size and location of said at least one panel objects and any display objects contained therein; and generating GUI data corresponding to said at least one panel and the plurality of display objects and submitting the GUI data to an operating system graphic subsystem to render the GUI on a display device.

* * * * *